June 27, 1933. T. C. SHEEHAN 1,915,478
GRINDING MACHINE FOR RAZOR BLADES
Filed July 26, 1928 9 Sheets-Sheet 1

INVENTOR
Thomas C Sheehan
Sydney J Prescott
ATTORNEY

June 27, 1933. T. C. SHEEHAN 1,915,478
GRINDING MACHINE FOR RAZOR BLADES
Filed July 26, 1928 9 Sheets-Sheet 6

June 27, 1933. T. C. SHEEHAN 1,915,478
GRINDING MACHINE FOR RAZOR BLADES
Filed July 26, 1928 9 Sheets-Sheet 8

June 27, 1933. T. C. SHEEHAN 1,915,478
GRINDING MACHINE FOR RAZOR BLADES
Filed July 26, 1928 9 Sheets-Sheet 9

Patented June 27, 1933

1,915,478

UNITED STATES PATENT OFFICE

THOMAS CORNELIUS SHEEHAN, OF UPPER MONTCLAIR, NEW JERSEY, ASSIGNOR TO WADE & BUTCHER CORPORATION, A CORPORATION OF NEW JERSEY

GRINDING MACHINE FOR RAZOR BLADES

Application filed July 26, 1928. Serial No. 295,597.

This invention relates to machines for automatically and uniformly grinding razor blades, particularly blades of the thin replaceable type used in certain safety razors.

One of the main objects of the present invention is to provide a machine of this type which will satisfactorily grind the new curved type of razor blade which is convex on one side and concave on the other, although the invention is not limited to the grinding of blades of this type. Another object of the invention is to provide a machine for performing all the necessary rough and fine grinding operations on one edge of such a blade during a single forwarding of the blade, and in which the rough and fine grinding cuts are in different directions, resulting in a smoother and better edge. Still another object is to obviate the difficulties heretofore had in holding razor blades steady, and at a definite predetermined angle, during forwarding past the grinding wheels. Under the pressure of the grinding surface, the blade tends to yield on the forwarding means, changing the angle of cutting, and vibration or whipping of the forwarding means further interferes with uniform grinding. It has been found that by pressing the blades against a fixed guide surface opposing the grinder, these difficulties can be avoided. Another object of the invention is to provide fine grinding means for finishing the grinding of the edge, which will provide a ground surface on each side of the edge of uniform width and appearance, and which will not vary as the grinding element wears.

Still another object is to provide blade feeding and stacking means for rapidly and automatically feeding curved razor blades onto the forwarding means, and after grinding, ejecting and stacking the same. Another object is to provide means for continuously checking the thickness of the ground edge so that, if the blades are for any reason improperly ground, this will be quickly detected before many blades are spoiled. Another object is to provide such a machine in which the wear on the grinding elements is gradual and in which these elements may be readily adjusted to such wear without disturbing the angle at which the blades are ground.

With these and other objects not specifically mentioned in view, the invention consists in certain constructions and combinations which will be hereinafter fully described and then specifically set forth in the claims hereunto appended.

In the accompanying drawings which form a part of this specification and in which like characters of reference designate the same or like parts:

Fig. 7 is a side elevation of the blade magazine shown in Fig. 6;

In carrying the invention into effect, there is provided a rotating grinder, means for forwarding blades with an edge exposed into the range of action of said grinder, and a grinding wheel cooperating with said forwarding means to further grind the already ground surface of the edge along a different direction of cut from that of the grinder in order to insure a smoother and better ground edge. In the best constructions, the machine is provided with a rotating grinding disk of substantially the same thickness as the width of the desired ground surface of the blades, together with means for forwarding the blades past the disk with an edge of the blade tangent to the peripheral edge of said disk, thereby obtaining a ground edge of uniform width and appearance. A machine in accordance with the invention will also preferably include fixed guide means having a guide surface opposite and cooperating with the grinder to hold the blades in predetermined relation to the grinder with the exposed edge of the blades against the same, together with means pressing the blades against said guide surface. In the best constructions also, there is provided in combination with means for forwarding the blades with an edge exposed, a grinder in the path of said edge and stationary means engaging opposite sides of said edge to the grinder during the grinding operation. The means above referred to may be widely varied in construction within the scope of the claims, for the particular machine selected to illustrate the invention is but one of many possible embodiments of the same. The invention, therefore, is not to be restricted to the precise details of the structure shown and described.

Figure 1:
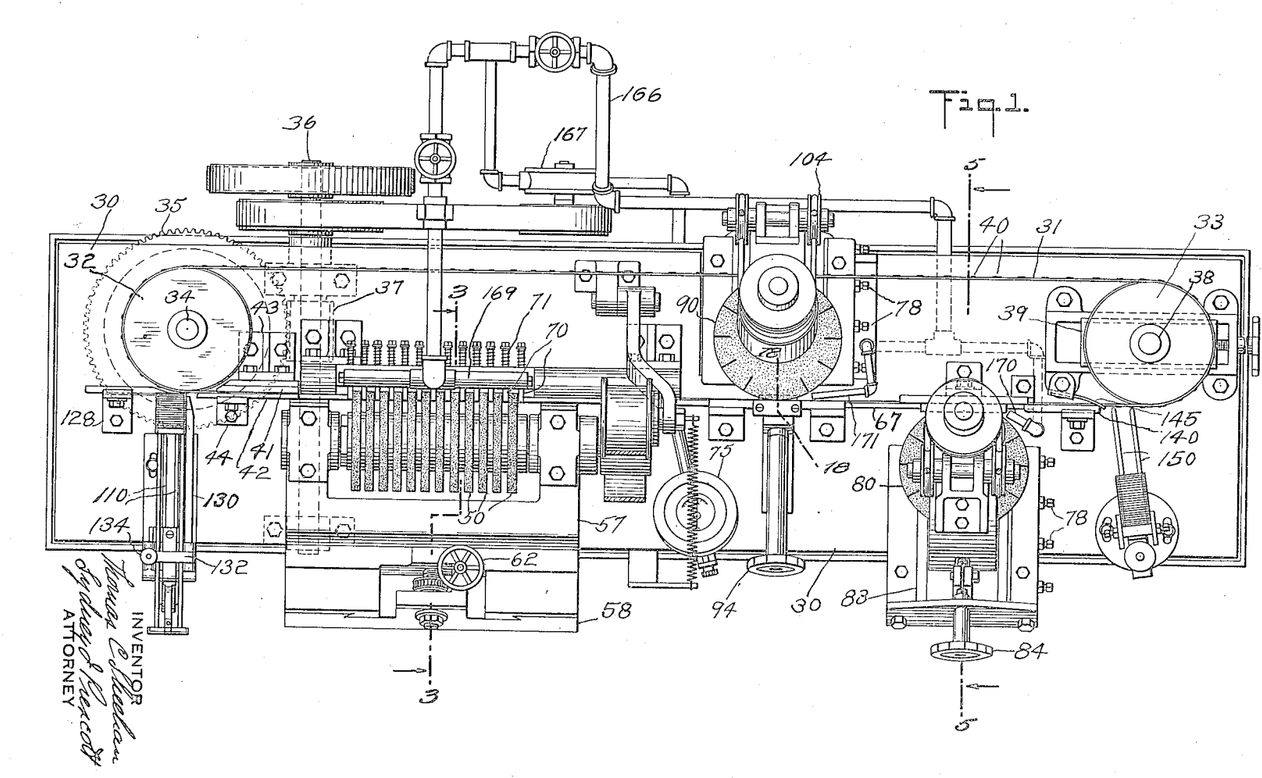
Fig. 1 is a top plan view of a machine embodying the invention.
Figure 2:
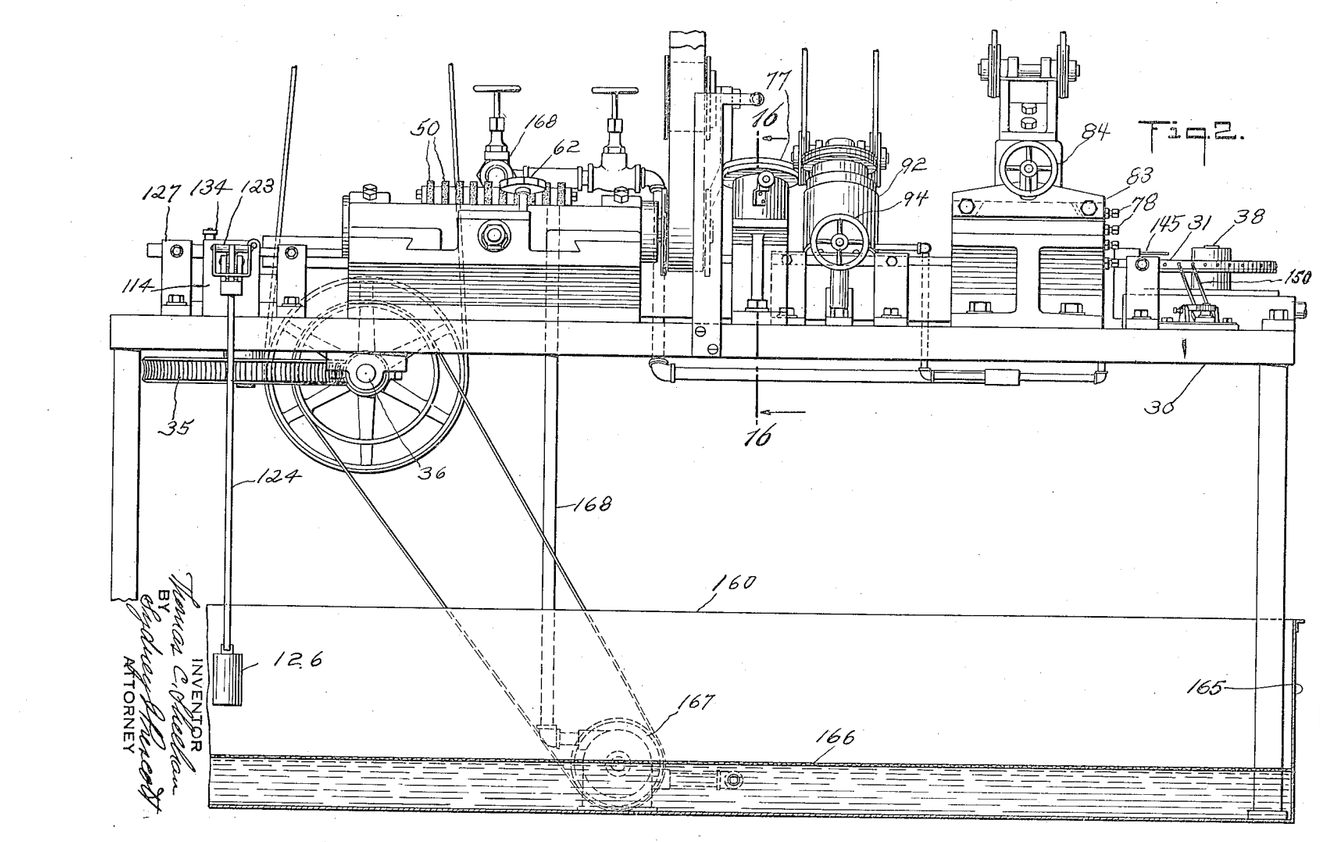
Fig. 2 is a front elevation of the machine shown in Fig. 1.

Referring to Figs. 1 and 2 of the drawings, there is provided a table 30 on which the blade forwarding belt 31 is supported by means of horizontal pulleys 32 and 33. Pulley 32 is supported by a shaft 34 journalled in a bearing on the table and driven by worm wheel 35 secured at its lower end, which in turn is driven from a main drive shaft 36 by a worm 37. Pulley 33 is mounted on a stub shaft 38 supported on a slide 39 on the table, by adjustment of which the belt may be tightened. This belt is provided with a series of lugs 40 for engaging the perforations or slots in the blades. Along one run of this belt are arranged the blade feed, the grinders, a gauge for indicating the depth of cut and the blade ejecting and stacking means. Opposed guides 41 and 42 mounted on brackets 43 and 44, respectively, on the table 30, serve to hold the blades on the belt and to guide the same from the blade feed to the rough grinder.

To rough grind the blades as they are forwarded by belt 31, a series of coaxially arranged grinding wheels 50 (Fig. 4) secured together in spaced relation on an arbor shaft 51 by washers 52 and clamp nuts 53 and 54, rotate in the path of the upper edge of the blades. Since each wheel does only a small part of the grinding, the wear on the wheels will be small. The arbor shaft of the rough grinder is supported in bearings 55 and 56 supported on a bearing block 57 mounted in a slideway 58, which slideway is inclined (as will be seen from Fig. 3) so as to render the axis of rotation of the rotating element movable only in a plane in which the center of curvature of the cylindrical guide block 60 lies. The purpose of this arrangement is to insure that the angle of the cutting face of the grinding wheel, with respect to the surface of the blade supported by the guide, shall remain unchanged by adjustment for wear of the rough grinding element.

For fine adjustment of the slide block along the slideway, a screw 61 journalled against longitudinal movement on the slideway is threaded in the slide block and driven by a hand wheel 62 having a worm 63 in engagement with a worm wheel 64 on said screw.

Figure 3:
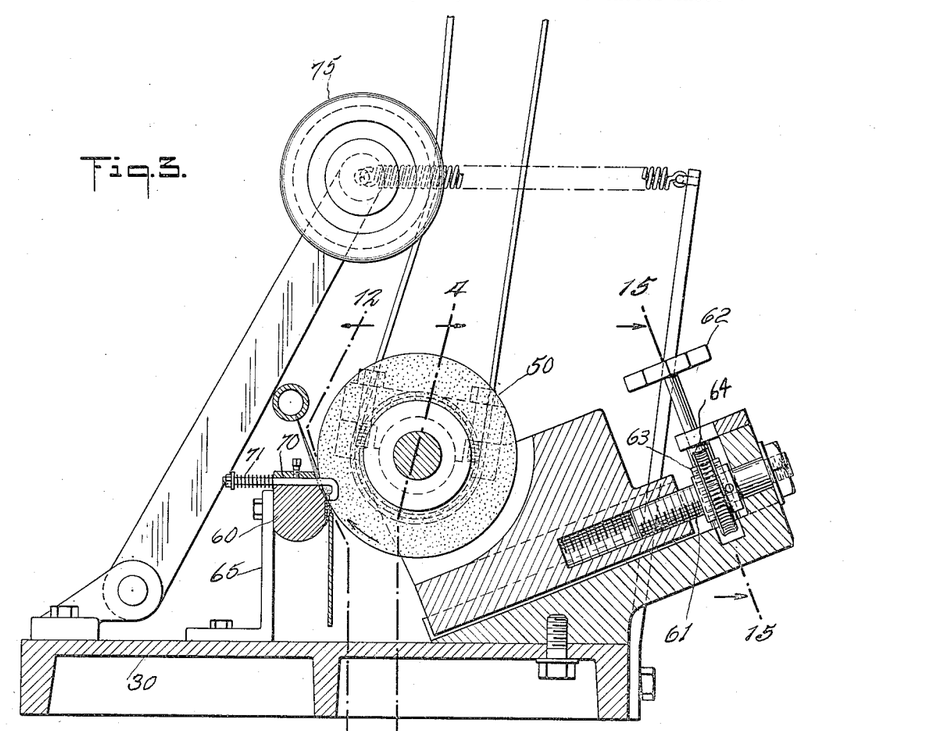
Fig. 3 is an enlarged cross sectional view taken on line 3—3 of Fig. 1.
Figure 4:
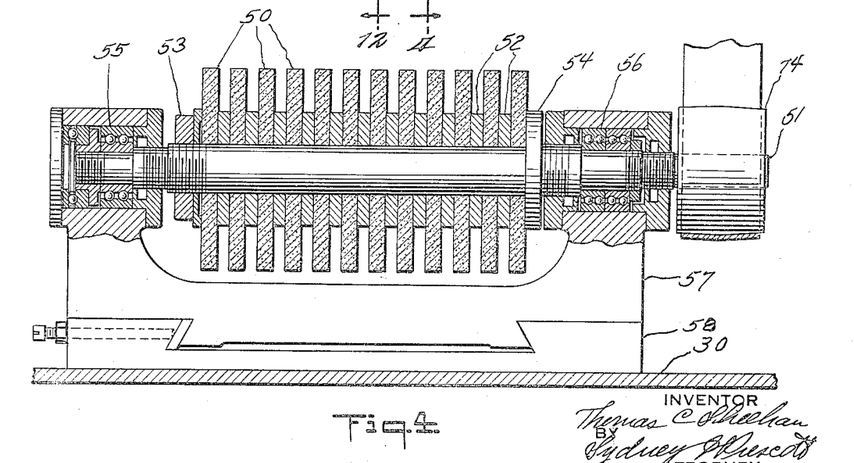
Fig. 4 is a vertical longitudinal section taken on line 4—4 of Fig. 3.

The cylindrical guide block 60 extends from guide 41 along the belt 31 opposite the rough grinder, fitting the curve of the concave side of the curved razor blade, and is supported from the table by means of brackets 65. This block is provided with a groove 66 to receive and guide the belt 31, and the cylindrical guide surface of the block, as shown in Fig. 3, is opposite to and cooperates with the rough grinder to hold the edge of each blade against said grinder at the proper angle for grinding the convex side of the blade.

Means are provided to press the blade against the guide surface of the block 60 to prevent vibration or whipping of the forwarding means and the blade, and to maintain the blade in a definite predetermined angular relation with respect to the grinding surface. These means consist of a stationary guide plate 67 engaging the blade below the lugs on the convex side to hold the lower portion of the blade against the guide, and having a horizontal guide surface 68 on which the blade supporting lugs 40 are supported and guided during forwarding movement of the belt. It will be noted that this guide plate also extends along the forwarding means past the gauge, and fine grinding means hereinafter described. Pressing the upper edge of the blade, during grinding thereof, against the guide block are a series of square shanked fingers 70 passing through square holes in the guide block and having hooked end portions extending into the spaces between the wheels 50. The ends of these hooks are curved to facilitate passage of the blade edge and press lightly on the blade edge to insure uniform contact of the concave surface of each blade with the guide surface of the block. Springs 71 on the shanks of the fingers engaging the guide block and nuts 72 on the ends of the shanks serve to urge the ends of the hooks against the blades. Set screws 73 are provided for locking the fingers out of contact with the blades when desired. A suitable pulley 74 on the arbor shaft of the rough grinder serves to drive the same and a conventional idler 75ª maintains the drive belt in proper relation to the pulley.

Measuring means are provided for indicating the depth of cut of the rough grinder, engaging the rough ground edge of the blade as the same is forwarded from the rough grinding means. These measuring means consist of a micrometer gauge 75 having a hardened feeler 76 which engages at the same point on the rough ground surface of the edge of each blade and operates indicating means, showing on the dial 77 of the gauge. Accordingly, if for any reason the rough grinder grinds the blade improperly, this will be indicated to the operator immediately on the dial of the gauge, since the latter continuously gives an indication of the thickness of the ground edge. The guide block 60 extends past the feeler of the gauge to hold the blades in uniform relation thereto.

After the rough grinding operation and checking of the rough ground edge by the gauge, the blades are carried by the forwarding belt past the fine grinding wheel 90 which lightly grinds the concave edge surface of the blades to the fine grinding wheel 80 on the convex side of the blades. This wheel consists of a narrow disk of finer abrasive material than the rough grinder, having a peripheral edge of the same width as the desired finished ground surface on the edge of the blades. This disk is mounted on a shaft 81 in a bearing block 82, which is at an angle to vertical corresponding to the angle to vertical of the edge surface of the blade, so that the peripheral edge of the disk is at a tangent to the rough ground edge of the blades and the plane of revolution of the disk is substantially perpendicular to the rough ground surface. This bearing block 82 is slidably mounted in a slideway 83, which is inclined at an angle to horizontal so that adjustment of the bearing block along the slideway will adjust the disk in its plane of revolution toward and away from the edge. For fine adjustment of the bearing block along the slideway a hand screw 84 journalled against longitudinal movement on the slideway screws in a block 85 secured to the bearing block.

To steady the blade and to hold it in definite fixed relation to the disk 80, a curved guide block 86 fixedly secured by bracket 87 to the table is provided. The convex side of the blade is held during the forwarding against the surface of this guide block which is curved to fit the blade, by means of the guide plate 67 hereinbefore described, engaging the blade below the lugs of the forwarding belt and having secured to it a spring finger 89 engaging the blade just below the disk to press the edge being ground against the block.

Figures 5, 22:
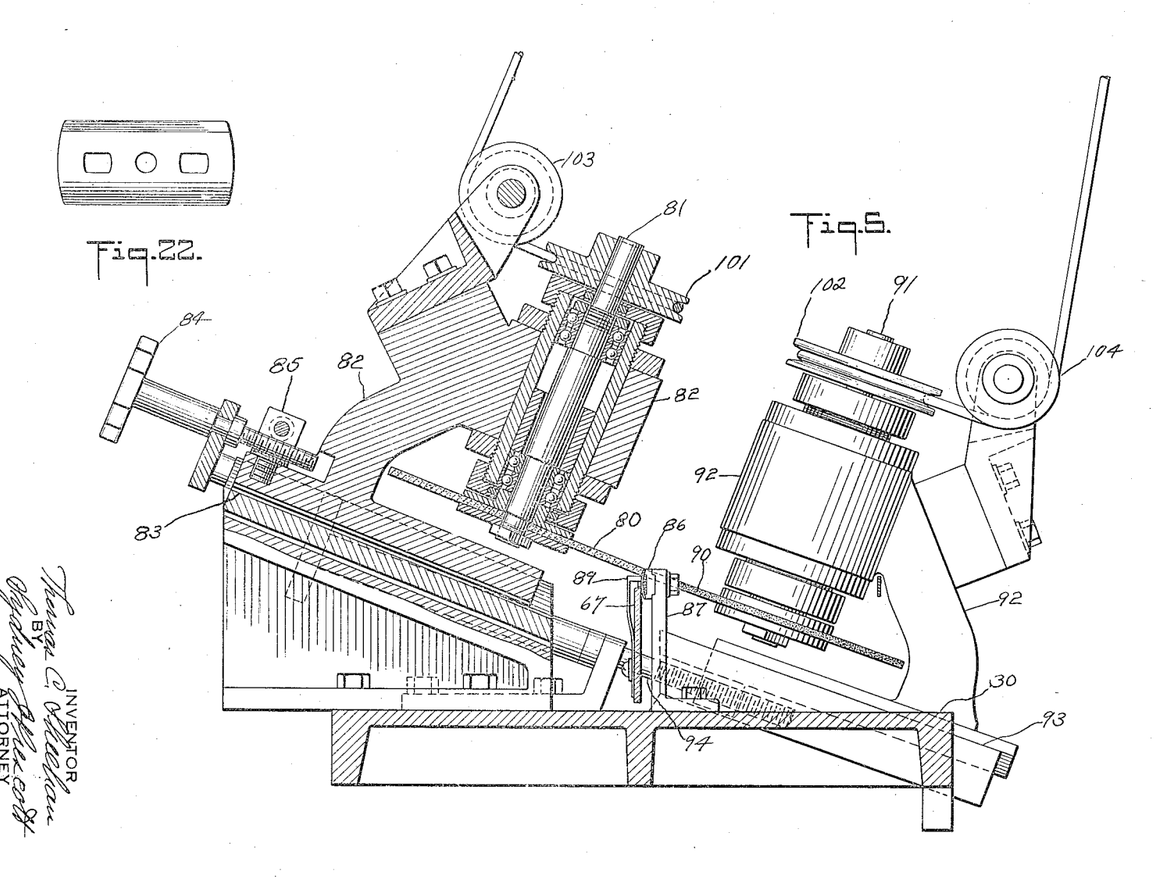
Fig. 5 is a vertical cross section taken on line 5—5 of Fig. 1, looking in the direction indicated by the arrows.
Fig. 22 is a detail view showing the curved razor blade from its convex side.

Before reaching this fine grinding disk the blades have been forwarded to the first similar fine grinding disk 90 on the opposite side of the blades for grinding lightly the concave edge surface of said blade. This grinding disk in the machine selected to illustrate the invention is identical with that of the fine ginding disk already described and is similarly mounted on a shaft 91 which, as will be seen from Fig. 5, is likewise supported by the bearing block 92 at such an angle that its peripheral edge is at a tangent to the edge of the blade with its plane of revolution substantially perpendicular to the concave edge surface thereof.

The bearing block 92 is also slidable in a slideway 93 which is inclined to support the bearing block for movement to adjust the disk in its plane of revolution toward and away from the concave edge surface of the blade. A hand screw 94 to facilitate fine adjustment of the disk is journaled against longitudinal movement in a bracket fixed to the table, screws in the bearing block 91. To oppose the fine grinder and to cooperate therewith to hold the blade in definite relation thereto a guide block 96 having an inclined surface 97 to engage the upper convex edge surface of the blade is adjustably secured by a screw and slot connection to a block 98 on a bracket 99 fast to the table. The guide plate 67 bears on the convex side of the blade below the belt lugs 40 and a spring finger 100 secured to the guide plate 67 and engaging the belt, presses the blade edge against the guide block.

These fine grinding disks engage the blade lightly, their function being to finish the rough ground surface and to insure uniformly ground surfaces of unvarying width, finish and appearance on both sides of the blades. Accordingly, wear on these grinding disks is relatively small and since the disks are of the same thickness as the width of the desired ground surface, wear of the curved disks will not change the width or appearance of the cut made thereby. These grinding disks are driven by suitable pulleys 101 and 102 secured to their respective shafts, and over which drive belts are guided by idlers 103 and 104 bracketed to the respective bearing blocks 82 and 92.

It is noted that the direction of cut of the fine grinding disk, i. e. the direction of the rotary movement of the peripheral edge of the disk with respect to the surface of the blade, is quite different from that of the rough grinder, viz. at right angles thereto, which results in better grinding and finish of the blades.

Since any play between the bearing blocks supporting the grinders 80 and 92 might result in changing the relation of their cutting surfaces to the blades, set screws 78 are provided in the slideways 83 and 93 for holding the respective bearing blocks in the slideways in definite position against one side of the slideways.

Figures 2, 6:
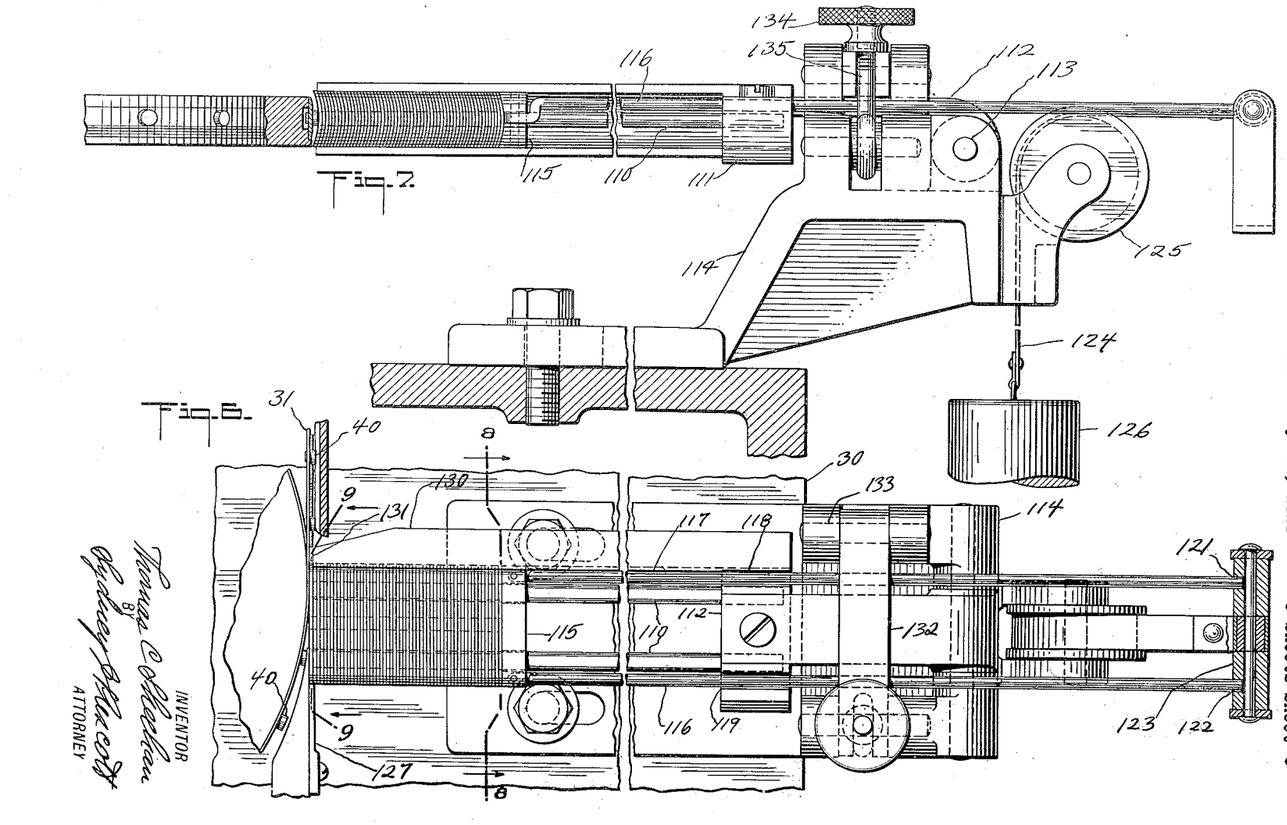
Fig. 6 is an enlarged plan view of the blade magazine.
Figure 8:
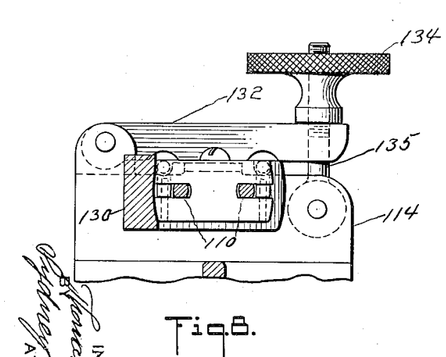
Fig. 8 is a cross section taken on line 8—8 of Fig. 6, looking in the direction indicated by the arrows.
Figure 9:
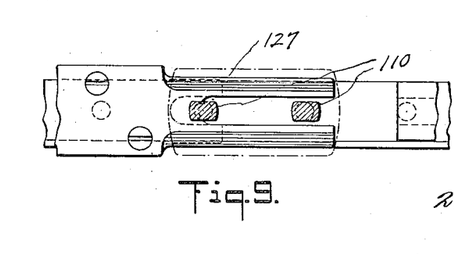
Fig. 9 is a vertical cross section taken on line 9—9 of Fig. 6, looking at the face of the belt as indicated by the arrows.
Figure 10:
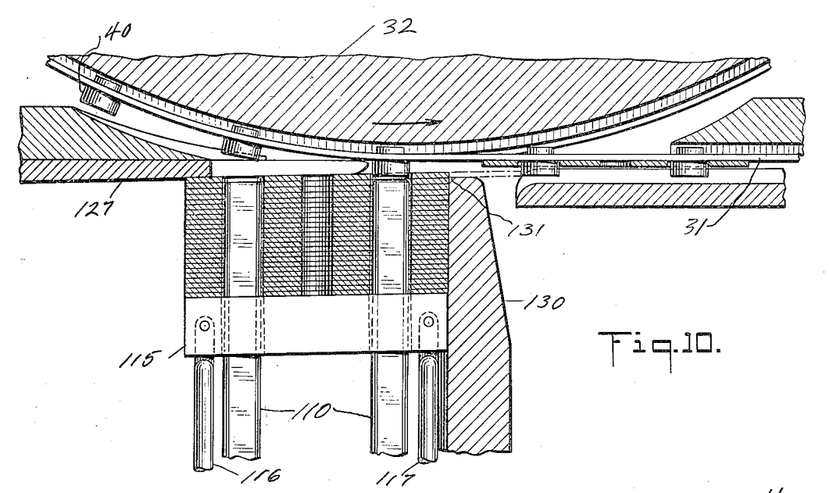
Figs. 10 and 11 are enlarged detail views in section showing the feeding of the blades from the magazine to the forwarding belt.
Figure 11:
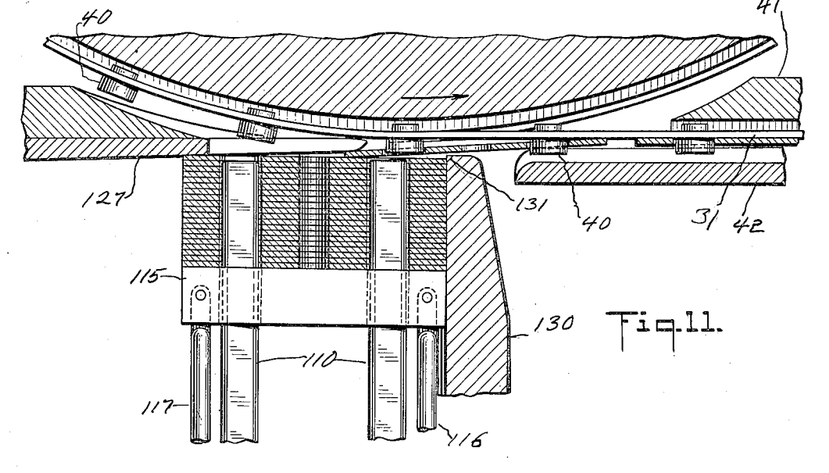
Figure 12:
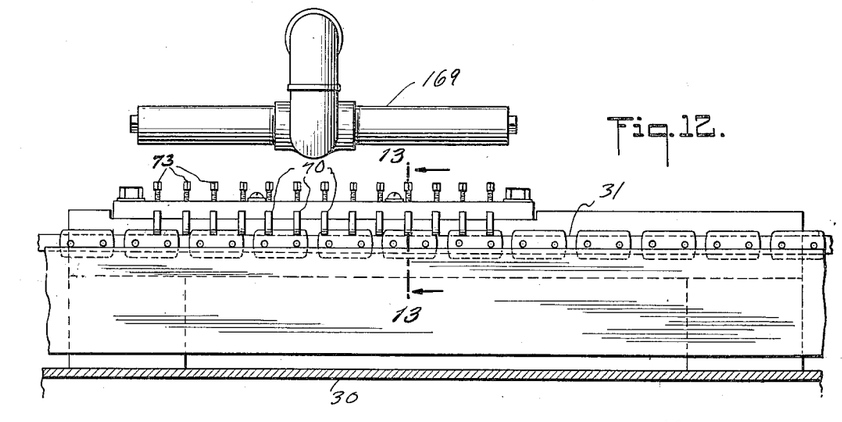
Fig. 12 is a vertical longitudinal section taken on line 12—12 of Fig. 3.
Figure 13:
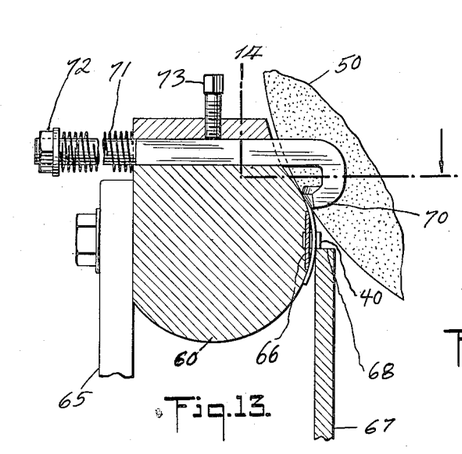
Fig. 13 is an enlarged detail view in cross section taken on the line 13—13 of Fig. 12.
Figure 14:
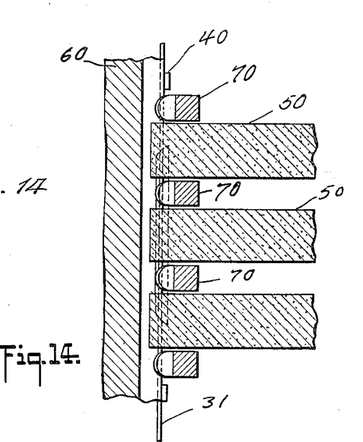
Fig. 14 is a horizontal longitudinal section taken on line 14—14 of Fig. 13.
Figure 15:
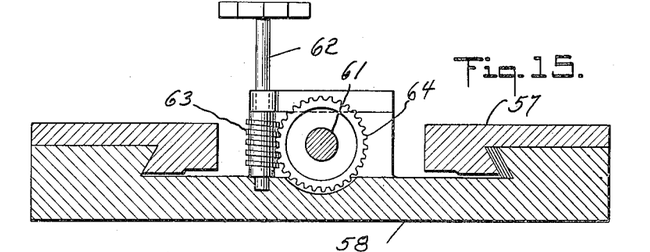
Fig. 15 is a sectional view on the line 15—15 of Fig. 3, showing the adjustment of the rough grinder.
Figure 16:
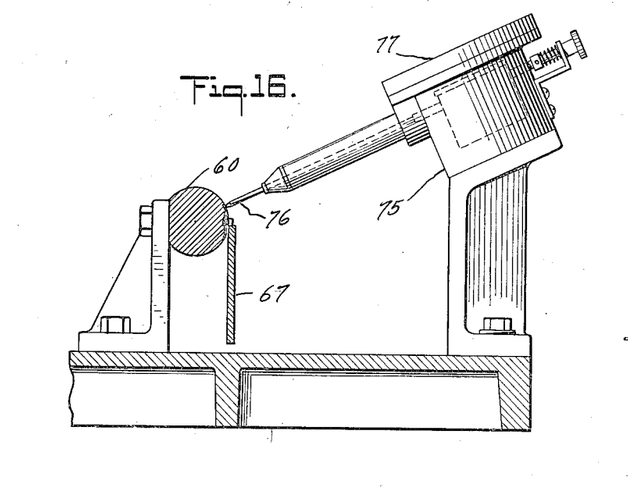
Fig. 16 is a sectional view on the line 16—16 of Fig. 2, showing the measuring gauge.
Figure 17:
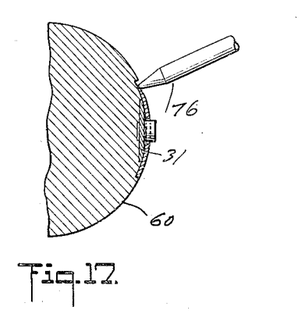
Fig. 17 is an enlarged detail view in section showing the relation of the feeler of the measuring gauge to the edge of the blade.
Figure 18:
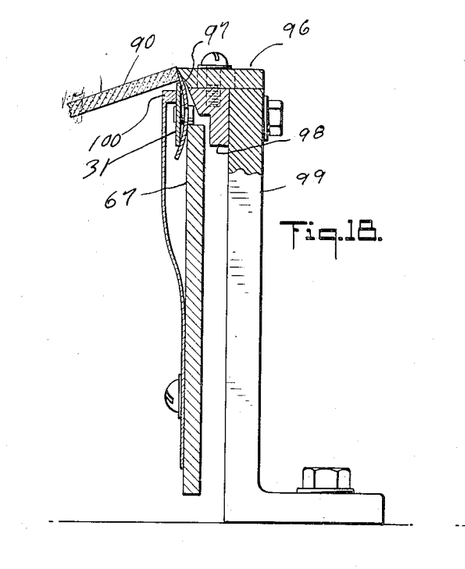
Fig. 18 is an enlarged view in vertical cross section on the line 18—18 of Fig. 1, showing the fine grinder on the concave side of the blade in its relation to the edge of the blade.
Figure 19:
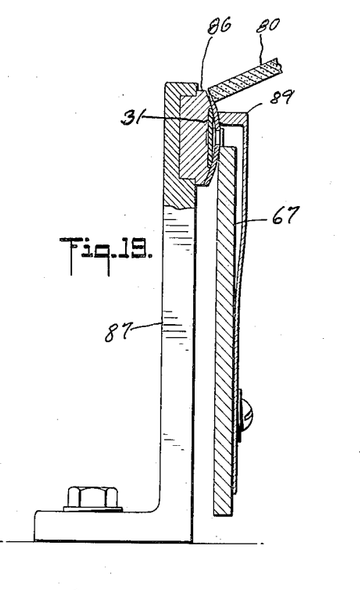
Fig. 19 is a view similar to that in Fig. 18, showing the fine grinder on the convex side of the blade.

Means are provided for feeding the curved blades individually from a stack or magazine onto the forwarding belt 31, thus dispensing with an attendant. This means (Figs. 6 to 11) includes a pair of arbor rods 110 engaging the perforations of the blades to support a stack of the same. These rods are secured to a block 111 fastened on the free end of an arm 112 which is pivoted at 113 to a bracket 114 mounted on the table and arranged to support the rods in horizontal position. To advance the stack toward the forwarding mechanism, there is provided a plunger 115 pivoted to a pair of plunger rods 116 and 117 guided in grooves 118 and 119 in block 120. The ends of these plunger rods are loosely engaged in socket holes 121 and 122 in a cross head 123 and secured to the center of this cross head is a belt 124 passing over a pulley 125 connected to a weight 126. As will be seen by an inspection of the structure shown in Figs. 7 and 8, the weight will force the plunger rods against the stack of blades to force the same against the forwarding means. As shown in Figs. 10 and 11, a wedge shaped member 127 supported by a bracket 127' secured to the table, extends between the rear portion of the blade being delivered from the stack and the forwarding belt to stop the same with its aperture in proper position to be entered by the lugs 40 in the arcuate movement thereof to be described. This stop member is forked to permit the following lugs to pass the stop member and engage the aperture. It will be noted, as shown in Fig. 6, that the stack of blades is placed with the blades on the near end of the stack substantially at a tangent to the pulley 32, whereby the arcuate movement of the lugs as the belt follows the circumference of the turret, will cause positive movement of the lugs into the perforations of the blades.

To prevent more than one blade passing from the stack at one time, a shouldered member 130 is provided, which engages the front edge of the stack, having its shouldered portion 131 spaced from the forwarding belt to permit the passage of one blade only, this shoulder portion being rigidly secured to the block 111 in any convenient way. To permit ready insertion of blades on the supports or arbors, a clamp 132 is pivoted at 133 and secured by a thumb nut 134 on a screw 135 pivotally secured to the bracket 114, the clamp engaging the supporting block between it and the bracket. As will readily be seen from Figs. 6 and 7, disconnecting this clamp will permit pivoting the stack supporting means as a whole to vertical position, in which the blades can easily be placed on the arbors.

Figure 20:
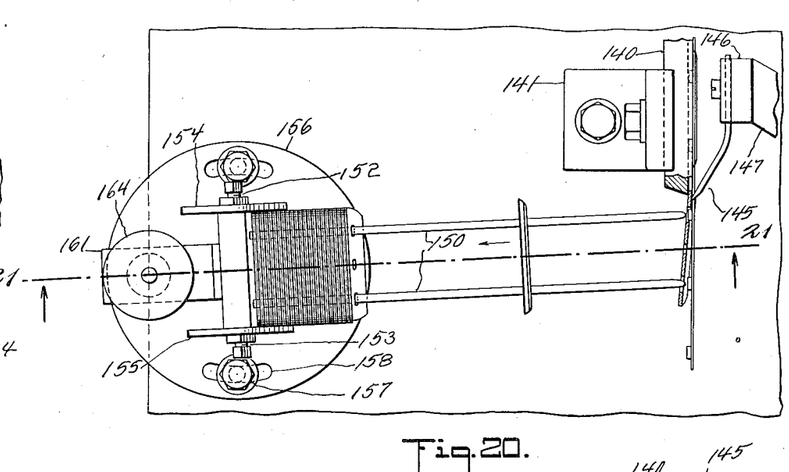
Fig. 20 is an enlarged detail view in plan of the blade ejecting and stacking device.
Figure 21:
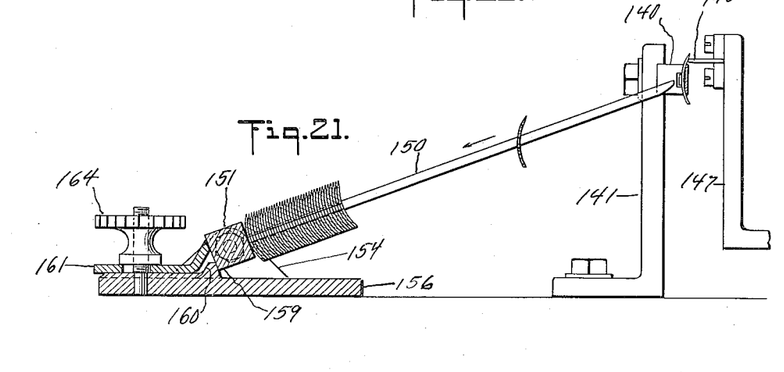
Fig. 21 is a sectional view taken on line 21—21 of Fig. 20.

After the blades have been ground, they are ejected from the belt 40 by means which will now be described (Figs. 20 and 21). Guide block 140 for holding the blades on the belt is supported by bracket 141 on the table, the end of which block is spaced less than the length of a blade from stacking arbors 150, which are supported on the table with their ends opposite and close to the perforations of the blades on the forwarding mechanism. Extending a little beyond the forward end 144 of this guide and opposed thereto, is provided a spring finger 145 supported by means of a clamp 146 on a bracket 147 secured to the table and arranged to engage the blade near its upper edge and to exert pressure on the blade a little beyond the end of the last mentioned guide. As will be obvious from an inspection of Fig. 21, this will result in the blade being flipped off the lugs from the forwarding means, the front surface of the blade engaging one of the arbors until the perforation comes opposite the arbors 150, whereupon the blade will be forced onto the arbors.

As shown in Fig. 11, the arbors are inclined downwardly from their blade receiving ends and are pivotally mounted by means of a block 151 in which the other ends of the arbors are received, the block being pivoted by pivot pins 152 and 153 to ears 154 and 155 extending from a base plate 156, which is secured on the table for adjustment by cap screws 157 in slotted apertures 158 in the base plate. To assure definite position of the block on the pivots with the arbors in blade receiving position, the block is provided with an extension 159 engaging a shouldered abutment 160 extending from the body of the base plate. To further retain the pivoted block with the arbors in proper position to receive the blades, a slotted plate 161, having a shouldered end portion to engage a corner of the block and prevent pivotal movement of same, is clamped to the upper surface of a boss 163 by means of a thumb screw 164. It will be clear then, that by loosening the thumb screw and withdrawing the slotted plate, the block may be swung to permit ready removal of the blades on the arbors.

Below the table 30 is provided a sump 165 in which there is a supply of oil, or other desired liquid. This sump has a horizontal strainer 166 to strain the liquid falling from the table and in communication with it is a suitable pump 167 from which, by means of piping 168, the desired liquid is forced through nozzle 169 to the rough grinder, nozzle 170 to the fine grinder 80 and nozzle 171 to the fine grinder 90.

The mode of operation of the machine will now be briefly described. The blades are individually removed from the arbor rods 110 of the blade feeding device by the lugs on the blade forwarding belt 31 and carried past the grinding wheels 50, which rough grind one edge of the blades, and then brought into engagement successively with the fine grinding wheels 90 and 80 which grind the both sides of said edge at right angles to the direction of cut of the grinding wheels 50. The feeler 76 of the micrometer gauge 75 checks the depth of cut of the rough grinder immediately after the blades leave the latter. After the fine grinding operation the blades are removed from the forwarding belt by the spring finger 145 which flips them onto the arbors 150 of the blade stacking device from which the finished blades may be removed as desired.

What is claimed is:

1. In a machine for grinding curved razor blades, the combination with blade forwarding mechanism, of a blade feeding device for feeding blades to said mechanism, means for rough grinding the convex side only of an edge of the blades while they are forwarded, means for thereafter fine grinding the convex side of said edge with the direction of cut at an angle to the direction of cut of said rough grinding means, whereby the tool marks of the rough grinding operation are removed, means for fine grinding the other side of said edge, mechanism for guiding said forwarding mechanism and the blades thereon, and a device for ejecting the blades from said forwarding mechanism and stacking the same, said guiding mechanism including a guide block having a curved surface fitting the curve of the concave side of the blades, and said rough grinding means including a plurality of coaxial spaced grinders having their axes disposed in a horizontal plane, and means for adjusting the axes of said grinders in a vertically inclined plane passing through the center of curvature of the curved surface on said guide block to compensate for wear on the grinders.

2. In a machine for grinding curved razor blades, the combination with blade forwarding mechanism, of a blade feeding device for feeding blades to said mechanism, means for rough grinding the convex side only of an edge of the blades while they are forwarded, means for thereafter fine grinding the convex side of said edge with the direction of cut at an angle to the direction of cut of said rough grinding means, whereby the tool marks of the rough grinding operation are removed, means for fine grinding the concave side of said edge, mechanism for guiding said forwarding mechanism and the blades thereon, and a device for ejecting the blades from said forwarding mechanism and stacking the same, said means for fine grinding the convex side of the blades including a grinder having its axis disposed in a vertically inclined plane and having its peripheral edge tangent to the rough ground edge of the blades and having its plane of revolution substantially perpendicular to said rough ground surface.

3. In a machine for grinding razor blades, the combination with blade forwarding mechanism, of a blade feeding device for feeding blades to said mechanism, means for rough grinding in one direction one side only of an edge of the blades while they are forwarded, means for thereafter fine grinding in another direction both sides of said edge, whereby the tool marks of the rough grinding operation are removed, mechanism for guiding said forwarding mechanism and the blades thereon, and a device for ejecting the blades from said forwarding mechanism and stacking the same, said guiding mechanism including a guide block disposed opposite said rough grinding means, fingers for pressing said edge of the blades against said guide block, and a stationary guide plate for pressing the other edge of the blades against said guide block.

4. In a machine for grinding razor blades, the combination with blade forwarding mechanism, of a blade feeding device for feeding blades to said mechanism, means for rough grinding in one direction one side only of an edge of the blades while they are forwarded, means for thereafter fine grinding in another direction both sides of said edge, whereby the tool marks of the rough grinding operation are removed, mechanism for guiding said forwarding mechanism and the blades thereon, and a device for ejecting the blades from said forwarding mechanism and stacking the same, said guiding mechanism including spaced guide blocks arranged on opposite sides of said forwarding mechanism adjacent said fine grinding means, spring pressed fingers for pressing said edge of the blades against said blocks and a stationary guide plate for pressing the other edge of the blades against said blocks.

5. In a machine for grinding perforated and curved razor blades, the combination with blade forwarding mechanism, of a blade feeding device for feeding blades to said mechanism, means for rough grinding the convex side only of an edge of the blades while they are forwarded, means for thereafter fine grinding said side of said edge with the direction of cut at an angle to the direction of cut of said rough grinding means, whereby the tool marks of the rough grinding operation are removed, mechanism for guiding said forwarding mechanism and the blades thereon, and a device for ejecting the blades from said forwarding mechanism and stacking the same, said ejecting device including a guide block having a concave face adapted to engage the convex side of the blades, a pair of arbor rods arranged to receive the blades from the guide blocks and enter the perforations of the same to support a stack of blades, and a spring arranged to guide the blades from said block to said rods.

6. In a machine for grinding razor blades, the combination with blade forwarding mechanism, of a blade feeding device for feeding blades to said mechanism, means for rough grinding in one direction one side only of an edge of the blades while they are forwarded, means for thereafter fine grinding in another direction both sides of said edge, whereby the tool marks of the rough grinding operation are removed, mechanism for guiding said forwarding mechanism and the blades thereon, means for lubricating said grinding means, and a device for ejecting the blades from said forwarding mechanism and stacking the same, said ejecting device including a spring finger arranged to disengage the blades from said forwarding mechanism and an arbor for supporting the blades removed from said forwarding mechanism.

7. In a machine for grinding curved razor blades, the combination with mechanism for forwarding the blades, of means for rough grinding in one direction the convex side only of one edge of the blades while they are forwarded, and means for thereafter fine grinding in another direction both sides of said edge of the blades while they are forwarded, whereby the tool marks of the rough grinding operation are removed, said rough grinding mechanism including a horizontal shaft disposed on one side of said forwarding mechanism, and a plurality of spaced grinders mounted on said shaft to engage the convex side of the blades.

8. In a machine for grinding curved razor blades, the combination with mechanism for forwarding the blades, of means for rough grinding in one direction the convex side only of one edge of the blades while they are forwarded, and means for thereafter fine grinding in another direction both sides of said edge of the blades while they are forwarded, whereby the tool marks of the rough grinding operation are removed, said fine grinding means including spaced vertically inclined shafts disposed on opposite sides of said forwarding mechanism and grinders carried by said shafts.

9. In a machine for grinding curved razor blades, the combination with mechanism for forwarding the blades, of means for rough grinding the convex side only of one edge of the blades while they are forwarded, and mechanism for guiding said forwarding mechanism and the blades thereon, said guiding mechanism including a guide block having a curved surface fitting into the concave side of the blades, and said means including a plurality of coaxial spaced grinders, and means for adjusting the axes of said grinders in a vertically inclined plane passing through the center of curvature of the curved surface of said guide block.

10. In a machine for grinding curved razor blades, the combination with mechanism for forwarding the blades, of means for rough grinding the convex side only of one edge of the blades while they are forwarded, and mechanism for guiding said forwarding mechanism and the blades thereon, said forwarding mechanism including a vertically disposed belt adapted to engage the concave side of the blades and lugs on said belt for supporting the blades, and said guiding mechanism including a guide block disposed opposite said rough grinding means and provided with a groove adapted to receive said belt.

11. In a machine for grinding curved razor blades, the combination with mechanism for forwarding the blades, of means for rough grinding the convex side only of one edge of the blades while they are forwarded, and mechanism for guiding said forwarding mechanism and the blades thereon, said means including a plurality of spaced grinders, said forwarding mechanism including a belt and lugs on said belt for supporting the blades, and said guiding mechanism including a guide block provided with a groove to receive said belt, a stationary guide plate arranged to support and guide the lugs on said belt and spring pressed fingers supported by said guide block and engaging said edge of the blades in the spaces between said grinders.

12. In a machine for grinding curved razor blades, the combination with mechanism for forwarding curved blades, of means for fine grinding both sides of one edge only of the blades, and mechanism for guiding said forwarding mechanism and the blades thereon, said forwarding mechanism including a belt adapted to engage the concave side of the blades and lugs on said belt for supporting the blades, and said guiding mechanism including a guide block provided with a groove to receive and guide said belt, and a stationary guide plate for supporting and guiding the lugs on said belt, and a spring-pressed finger arranged to press the blades against said block.

13. In a machine for grinding curved razor blades, the combination with mechanism for forwarding curved blades, of means for fine grinding both sides of one edge only of the blades, and mechanism for guiding said forwarding mechanism and the blades thereon, said means including a grinder arranged to engage the convex side of said edge of the blades and said guiding mechanism including a curved guide block provided with a groove to receive and guide said belt and adapted to engage the concave side of the blades opposite said grinder, and a spring-pressed finger arranged to press the blades against said block.

14. In a machine for grinding curved razor blades, the combination with mechanism for forwarding curved blades, of means for fine grinding both sides of one edge only of the blades, and mechanism for guiding said forwarding mechanism and the blades thereon, said means including a grinder arranged to engage the concave side of said edge of the blades and said guiding mechanism including a guide block having an inclined surface adapted to engage the convex side of said edge of the blades opposite said grinder, and a spring-pressed finger arranged to press the blades against said block.

15. In a machine for grinding curved razor blades, the combination with mechanism for forwarding curved blades, of means for fine grinding both sides of one edge only of the blades, and mechanism for guiding said forwarding mechanism and the blades thereon, said guiding mechanism including a curved guide block adapted to engage the concave side of the blades and a spring finger arranged to press the blades against said block.

16. In a machine for grinding curved razor blades, the combination with mechanism for forwarding curved blades, of means for fine grinding both sides of one edge only of the blades, and mechanism for guiding said forwarding mechanism and the blades thereon, said guiding mechanism including a guide block having an inclined surface adapted to engage the convex side of the blades and a spring finger arranged to press the blades against said block.

17. A blade removing and stacking device comprising a guide block having a concave face adapted to engage the convex side of curved blades, a pair of arbor rods arranged to receive the blades from the guide block and support a stack of the same, and a spring finger arranged to guide the blades from the block to the rods.

18. In a machine for grinding perforated razor blades, the combination with means for grinding the blades, of a pair of pulleys, a travelling razor blade forwarding belt threaded over said pulleys, said belt being provided with blade supporting lugs adapted to enter the perforations in the blades, and a device for feeding blades into a position tangent to the portion of said belt on one of said pulleys, whereby the arcuate movement of said lugs as the belt follows the circumference of the pulley will cause said lugs to enter the perforations of the blades.

19. In a machine for grinding perforated razor blades, the combination with means for grinding the blades, of a pair of pulleys, a travelling razor blade forwarding belt threaded over said pulleys, said belt being provided with blade supporting lugs adapted to enter the perforations in the blades, and a device for feeding blades into a position tangent to the portion of said belt on one of said pulleys, whereby the arcuate movement of said lugs as the belt follows the circumference of the pulley will cause said lugs to enter the perforations of the blades, said device including an arbor rod supporting a stack of blades, a plunger for advancing the stack of blades to said belt, and a bifurcated stop member arranged to stop the foremost blade in the stack in a position tangent to the portion of the belt running over the pulley, whereby the lugs on said belt may pass through the bifurcation in said stop member to engage the perforation in the foremost blade.

In testimony whereof, I have signed my name to this specification.

THOMAS CORNELIUS SHEEHAN.